United States Patent [19]

Bake et al.

[11] E Re. 30,989

[45] Reissued Jul. 6, 1982

[54] SEALED VALVE AND RELATED STRUCTURE

[75] Inventors: Earl A. Bake, Pittsburgh; William G. Lunt, Monroeville, both of Pa.

[73] Assignee: Rockwell International Corporation, Pittsburgh, Pa.

[21] Appl. No.: 165,419

[22] Filed: Jul. 3, 1980

Related U.S. Patent Documents

Reissue of:

[64] Patent No.: 3,874,636
Issued: Apr. 1, 1975
Appl. No.: 417,381
Filed: Nov. 19, 1973

U.S. Applications:

[63] Continuation of Ser. No. 770,730, Feb. 22, 1977, abandoned.

[51] Int. Cl.[3] ..... F16K 31/50
[52] U.S. Cl. ..... 251/335 A
[58] Field of Search ..... 251/335 A, 335 R

[56] References Cited

U.S. PATENT DOCUMENTS

| | | | |
|---|---|---|---|
| 60,223 | 12/1866 | Morrill | 251/335 A |
| 1,494,910 | 5/1924 | Hench | 251/335 A |
| 1,631,406 | 6/1927 | Eisenhauer | 251/335 R |
| 1,749,774 | 3/1930 | McKay | 251/335 A |
| 2,061,028 | 11/1936 | Forbes et al. | 251/335 A |
| 2,388,046 | 10/1945 | Emrich | 251/335 A |
| 2,618,458 | 11/1952 | Fosbender | 251/335 A |
| 3,126,194 | 3/1964 | Franck | 251/335 R |

FOREIGN PATENT DOCUMENTS

| | | | |
|---|---|---|---|
| 907961 | 2/1954 | Fed. Rep. of Germany . | |
| 783370 | 4/1935 | France | 251/335 A |
| 1177123 | 4/1959 | France . | |
| 473935 | 7/1968 | Japan | 251/335 R |
| 331070 | 3/1930 | United Kingdom | 251/335 A |
| 701026 | 12/1953 | United Kingdom | 251/335 A |
| 958810 | 5/1964 | United Kingdom | 251/335 A |

*Primary Examiner*—H. Jay Spiegel
*Attorney, Agent, or Firm*—LeBlanc, Nolan, Shur & Nies

[57] ABSTRACT

A metal diaphragm valve including a multiple ply metal diaphragm structure comprised of a plurality of thin circular metal elements each having a planar annular rim surrounding a dome-shaped interior portion superimposed one on top of another with their annular rims fixed together to seal the hollow interior portion of a valve bonnet. A diaphragm contacting surface including at least two areas of different degrees of curvature, one of which is cruciform in shape, is mounted for axial movement in the valve bonnet. A method of making the metal diaphragm structure and a hermetically sealed valve assembly are also disclosed.

23 Claims, 7 Drawing Figures

SEALED VALVE AND RELATED STRUCTURE

Matter enclosed in heavy brackets [ ] appears in the original patent but forms no part of this reissue specification; matter printed in italics indicates the additions made by reissue.

*This application is a continuation of application Ser. No. 770,730 filed Feb. 22, 1977 for SEALED VALVE AND RELATED STRUCTURE, now abandoned which is a reissue of Pat. No. 3,874,636.*

BACKGROUND OF THE INVENTION

This invention is directed to a metal diaphragm valve and related structure including a novel multiple ply diaphragm structure and diaphragm plunger means arranged to deflect the diaphragm when it is desired to operate the valve. The invention also includes a novel method of making a composite multiple ply diaphragm structure and, in one embodiment, provides a hermetically sealed valve.

Metal diaphragm valves have found considerable utility as isolating or shut-off valves for toxic or other dangerous fluids and for borated water safety systems in nuclear fueled power generating plants. These valves employ a metal diaphragm member disposed transversely across a cavity in the valve body to provide a metal barrier and thereby seal the fluid present in the body cavity and flow passages on one side of the diaphragm from leakage through or around a valve operating mechanism provided on the other side of the diaphragm. These valves usually include a closure member mounted for axial movement to engage a valve seat on the fluid side of the diaphragm and a diaphragm plunger mounted for movement to contact and deflect the diaphragm and move the closure member to engage the valve seat and close the valve. Certain valves embodying a metal diaphragm member and this general principle of operation are shown in U.S. Pat. No. 2,144,754, issued Jan. 24, 1939; No. 2,277,395, issued Mar. 24, 1942; No. 2,986,372, issued May 30, 1961 and No. 3,126,194, issued Mar. 24, 1964.

Such prior art valves have usually employed a convexly curved or dome-shaped diaphragm with a circumferential edge portion of the diaphragm seated between a shoulder provided to the valve body and an opposing surface of a valve bonnet or cover secured to the body to close the cavity provided therein. The circumferential edge portion of the diaphragm seated between the opposing surfaces presents a potential leakage path across the interface between the fluid side surface of the diaphragm and the oppositely disposed seating surface. Also, if the diaphragm is of diametrically continuous curvature, the oppositely disposed seating surfaces will provide a annular stress region bounding the internal flexing portion of the diaphragm which region is susceptible to cracking after repeated flexure of the diaphragm. The prior art valves have also employed a diaphragm contacting surface of spherical curvature on the plunger which provides a circular diaphragm deflecting pattern. Although a circular deflecting pattern is satisfactory for many types of service, the spherical plunger surface uniformly distorts the entire central area of the diaphragm and provides radially progressive, concentric annular stress areas where stress induced cracking of the diaphragm surfaces may propagate in a circular path around the diaphragm.

With the foregoing considerations in mind, it is a principle purpose and object of this invention to provide a metal diaphragm valve having an improved multiple ply diaphragm structure.

Another object is to provide a method of making an improved dome-shaped multiple ply diaphragm structure.

A further object of this invention is to provide a diaphragm plunger having an improved diaphragm contacting and deflecting surface.

A still further object is to provide a hermetically sealed metal diaphragm valve in which all potential fluid leakage paths are sealed by a metal barrier.

SUMMARY OF THE INVENTION

This invention provides an improved multiple ply diaphragm structure which comprises a number of thin, circular metal elements each having a dome-shaped interior portion surrounded by a flat annular rim superimposed one on top of the other with the annular rims fixed together to provide a rigid peripheral edge to the composite structure while permitting independent flexure of the dome-shaped interior portions thereof. The dome-shaped diaphragm structure is made by superimposing the desired number of circular metal discs on top of one another to provide a stacked assembly which is secured between a pair of oppositely disposed annular clamping members. A pressure force is applied to one side of the stacked assembly to sequentially deform each successive metal disc in the stacked assembly to the desired degree of curvature while the clamping members maintain the circumferential edge of the stacked assembly flat. After the clamping members are removed, the flat annular edge portions of the stacked assembly are fixed together to provide a circumferential fixed composite diaphragm structure.

The invention also includes the provision of an improved diaphragm contacting surface on the plunger which includes a cross-shaped primary deflecting pattern and relief areas for portions of the diaphragm between the legs of the cross-shaped pattern.

The present invention also provides a hermetically sealed valve by means of two circumferentially extending welds, one between the circumferential edge of the diaphragm and the valve bonnet and the other between the valve bonnet and the valve body which together with the metal diaphragm provide a metal barrier across and seal all prospective fluid leakage paths from the valve body cavity.

The foregoing objects and features of the present invention and the advantages provided thereby will be more fully understood upon further study of the following description of one embodiment of the invention and the accompanying drawings.

DESCRIPTION OF THE DRAWINGS

In the drawings, wherein like numerals represent like parts.

DESCRIPTION OF THE INVENTION

Figure 1:
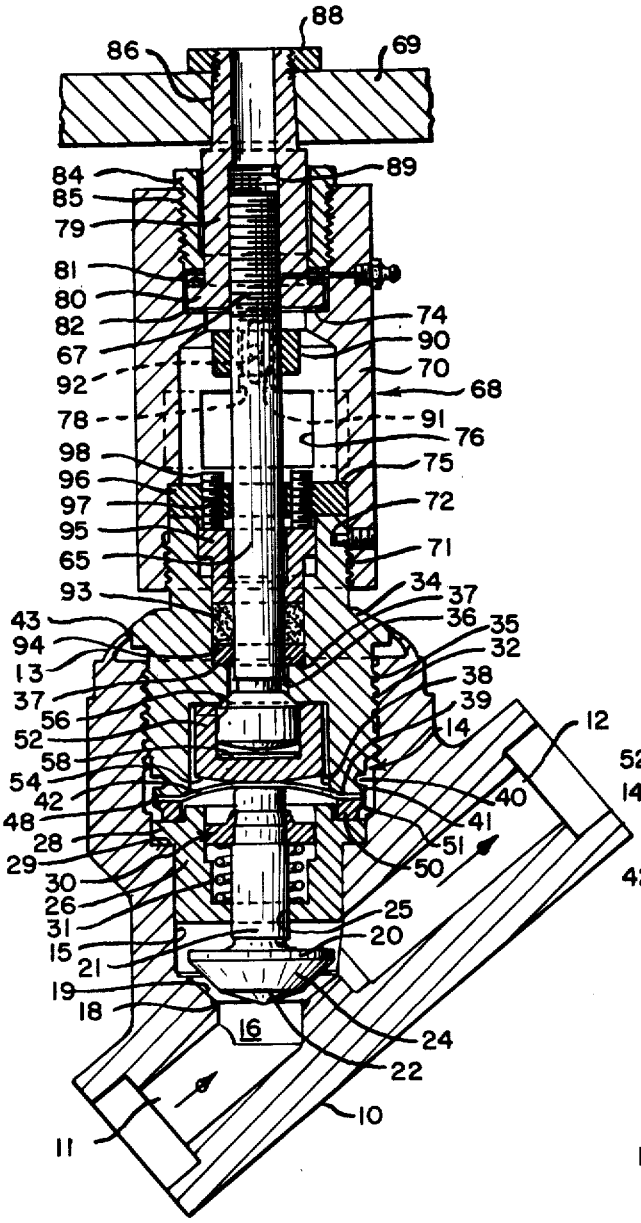
FIG. 1 is a side elevation mainly in section showing a metal diaphragm valve according to the present invention.
Figure 2:
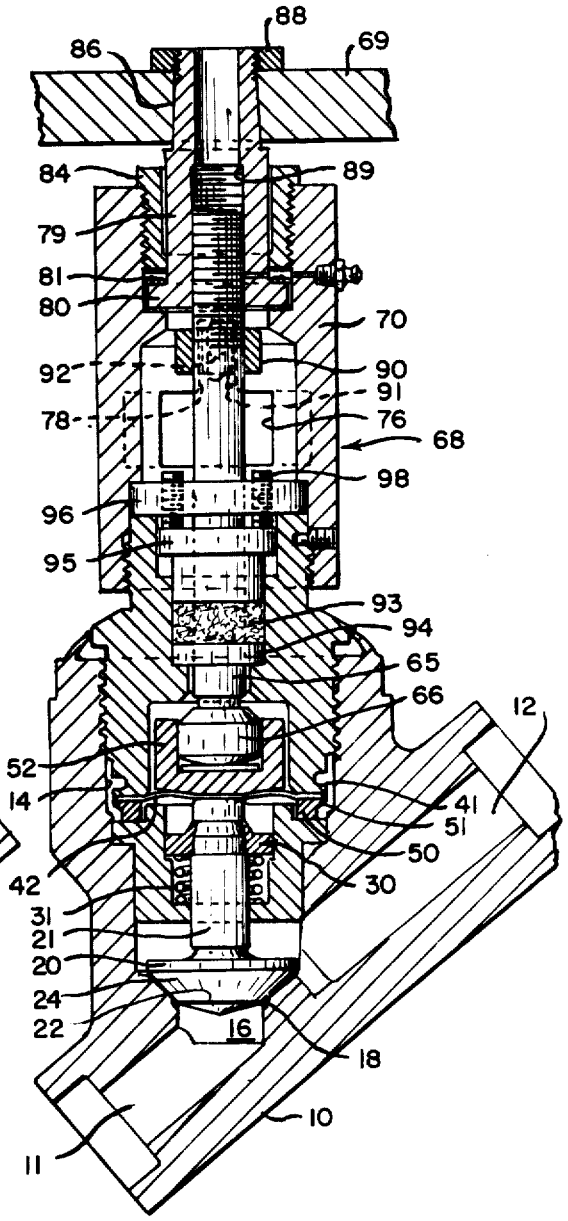
FIG. 2 is a view similar to FIG. 1 with the valve shown in the closed position.
Figure 3:
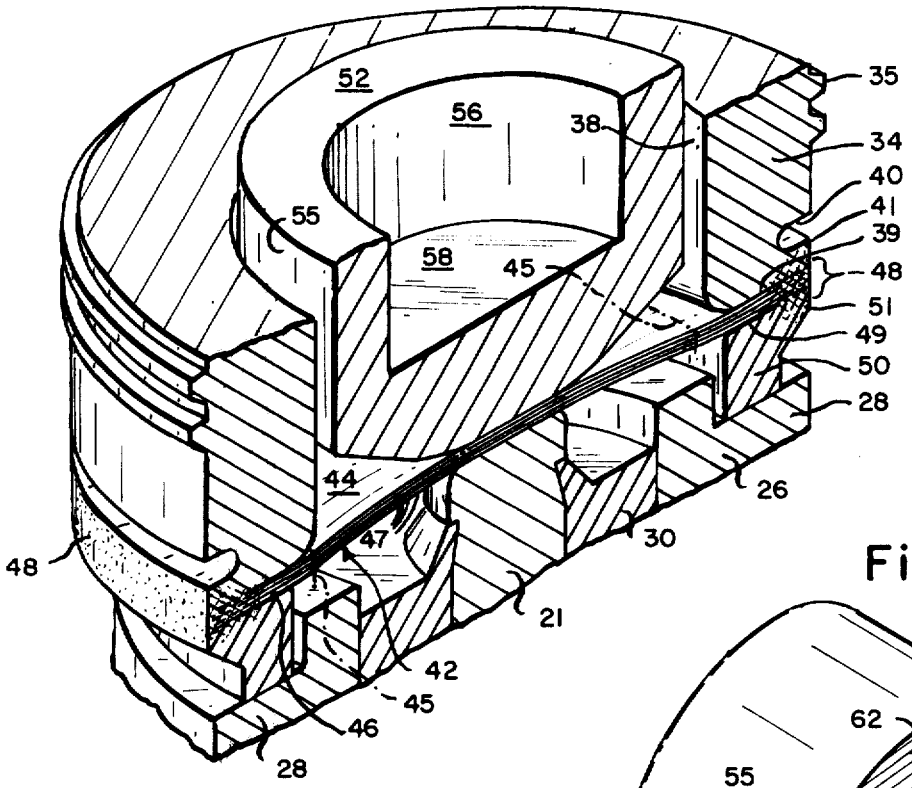
FIG. 3 is an elarged perspective view, partly in section, showing details of the diaphragm mounting and related valve actuating means of FIG. 1.
Figure 4:
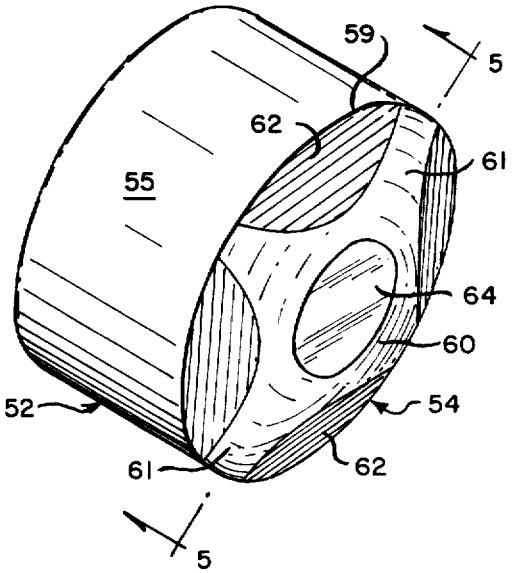
FIG. 4 is an enlarged perspective view of the diaphragm plunger of FIG. 1.
Figure 5:
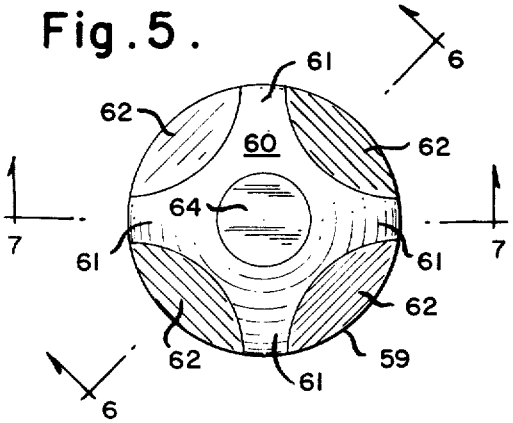
FIG. 5 is a plan view taken along the line 5—5 of FIG. 4.
Figure 6:
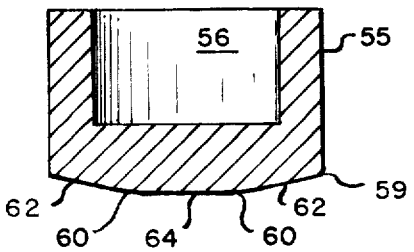
FIG. 6 is a sectional view taken along the line 6—6 of FIG. 5.
Figure 7:
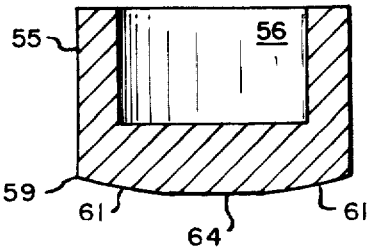
FIG. 7 is a sectional view taken along the line 7—7 of FIG. 5.

Referring now to the drawings, particularly FIGS. 1 and 2, the invention is illustrated as incorporated in a metal diaphragm valve having a valve body 10 provided with an inlet passage 11 and an outlet passage 12 which communicate at their inner ends with a generally cylindrical flow control chamber 15 provided at the lower end of a body cavity 14. The body cavity 14, control chamber 15, and an extension 16 of the inlet passage 11 are provided by a number of sequential boring operations effected on the valve body 10. The extension 16 provides a circular seat port at the intersection of the inlet passage 11 with the control chamber 15. An inlaid hardened valve seat 18 preferably having a frusto-conical surface configuration is provided around the periphery of the seat port 16. An outwardly diverging conical surface 19 is provided in contiguous surrounding relationship to the valve seat 18.

A disc closure member 20 having an integral disc stem 21 is mounted for axial movement toward and away from the valve seat 18 in the flow control chamber 15. The surface of the disc 20 facing the valve seat 18 is provided with a annular seating surface 22 and an outwardly diverging frusto-conical surface 24 disposed opposite to the frusto-conical surface 19. The annular seating surface 22 is preferably formed of a hardened metal inlaid in the disc surface and adapted to sealingly engage the valve seat 18 when the disc is moved to the closed position as shown in FIG. 2. The disc stem 21 is slidably received in an aperture 25 provided in a generally cylindrical control cartridge 26 having a radially extending flange 28 seated on a shoulder 29 provided in the valve body cavity 14. Internally of the cartridge 26, the disc stem 21 has a collar 30 swaged thereon. A spring 31 having its opposite ends seated against the collar 30 and the internal surface of control cartridge 26 around aperture 25 provides a biasing force to move the disc 20 to a position spaced from the valve seat 18 to open the valve and permit fluid flow in the direction designated by the arrows shown in FIG. 1.

The outer end of the body cavity 14 is internally threaded at 32 to receive the externally threaded portion 35 of a valve bonnet 34 having a stepped through bore 36. The stepped through bore 36 opens into a hollow cylindrical interior portion 38 of the bonnet 34 bounded at its lower extremity by a depending annular surface 39. A circumferentially continuous groove 40 provided to the bonnet adjacent the annular surface 39 provides a radially extending bonnet lip 41. A domed-shaped metal diaphragm 42 is provided transversely across the hollow interior portion 38 of bonnet 34 and fixed between the depending annular surface 39 and an oppositely disposed annular surface 49 of a metal ring 50 in a manner which will be more fully described hereinbelow.

A cup-shaped diaphragm plunger 52 having a diaphragm contacting surface 54 of generally convex curvature is mounted for axial movement in the hollow interior portion 38 of bonnet 34. A collar 66 provided at the lower end of a valve operating stem 65 is slidably received within the cylindrical bore 56 of diaphragm plunger 52 to provide axial movement to the plunger upon engagement of collar 66 with bearing surface 58.

A yoke assembly 68 and hand wheel 69 provide means for effecting axial movement of the operating stem 65 to open or close the valve. The yoke assembly includes a hollow cylindrical yoke member 70 internally threaded at 71 for engagement with and support by an externally threaded upstanding portion 72 of the valve bonnet 34. Internally, the yoke member 70 is provided with a pair of oppositely disposed shoulders 74 and 75. A pair of diametrically opposed access openings 76, only one of which is shown, are provided through the sidewall of the yoke member 70. The upper edge of the access opening 76 is provided with an axially extending slot 78.

The yoke member 70 rotatably mounts a stem driving member 79 having an integral circumferentially extending flange 80 seated for rotary movement between a lubricated bearing 81 and a low friction thrust washer 82 seated on the shoulder 74. The stem driving member 79 and lubricated bearing 81 are fixed against axial withdrawal by a yoke bushing 84 threadedly engaged at 85 with the yoke member 70. The stem driving member 79 is fixed by some suitable means such as the tapered surface 86 and lock nut 88 to the hand wheel 69. A threaded bore 89 provided to the driving member 79 is engaged with the threaded upper portion 67 of the valve operating stem 65 to effect axial movement to the stem upon rotation of the hand wheel 69 and stem driving member 79. A collar 90 having a radially extending arm 91 is keyed to the valve operating stem 65 at 92. The radially extending arm 91 is slidably received in the axially extending slot 78 to prevent rotary movement of the operating stem 65.

Conventional packing 93 is provided in the through bore of the bonnet 34 to prevent fluid leakage around the operating stem 65 in the event of diaphragm failure. The packing 93 is pressed between a packing ring 94 seated on the shoulder 37 provided in the bonnet through bore and packing gland 95. A packing loading ring 96 is fixed in position between the shoulder 75 of yoke member 70 and the upper surface of the valve bonnet 34. The packing loading ring 96 is provided with suitably spaced openings, preferably four equally spaced openings, which receive an equal number of hexagonal socket head set screws 98 or similar threaded members for applying pressure to the packing gland 95. The diametrically opposed openings 76 provide access to the interior of yoke member 70 for adjustment of the screws 98.

After the valve bonnet 34 is threaded to the valve body to seat the flange 28 of control cartridge 26 on body cavity shoulder 29, a circumferential weld 43 is conventionally effected between the exterior surface of the bonnet 34 and a flange 13 provided around the body cavity 14 to seal against fluid leakage between the valve bonnet and the body cavity.

The improved multiple ply diaphragm structure 42 and the diaphragm contacting surface of the plunger 52 will now be described with reference to FIGS. 3–7 where these components are illustrated in greater detail.

The diaphragm structure 42 is comprised of a number of thin metal elements 47 superimposed one on top of the other. Each element 47 is formed to have a spherically curved, dome-shaped interior portion bounded by a flat annular rim. This composite assembly provides a diaphragm 42 having [dome-shaped] domeshaped interior portion 44 circumferentially bounded as shown by the dotted line 45 by a flat circumferential edge portion 46. The edge portion 46 radially outwardly of the active operational, domed interior portion 44 is fixed between the oppositely disposed annular surfaces 39 and 49 of valve bonnet 34 and ring 50 by a circumferential extending weld designated by the numeral 48 and the cross hatching in FIG. 3. The weld 48 is effected to fuse the flat annular rims of each element comprising the peripheral edge portion 46 of the diaphragm 42 together and to the radially extending lips 41 and 51 of the valve bonnet 34 and metal ring 50. The fusion weld 48 provides a rigid circumferential edge 46 to the multiple ply diaphragm structure 42 and seals the hollow interior portion 38 of the bonnet 34 from fluid present in the body cavity 14. The fusion weld 48 is provided radially outward of the dome-shaped interior portions of each element providing the dome-shaped interior portion 44 of the composite diaphragm structure 42 thereby permitting independent flexure of the dome-shaped interior portions of each diaphragm element 47 without restraint by the remote rigid, circumferential edge 46.

The diaphragm elements 47 of each multiple ply diaphragm structure 42 are formed simultaneously in the same sequential order in which they are used to insure that the convexly curved surface and annular rim portion of each element will be complementary to the oppositely disposed concave surface and annular rim portion of each successive element. This is accomplished by superimposing a number of thin, metal discs one on top of the other to provide a stacked assembly. The annular edge portions of the stacked assembly are then secured between a pair of oppositely disposed annular clamping members in a pressure vessel and a force provided by hydraulic fluid in the pressure vessel is applied to one side of the stacked assembly. This provides a uniform force to concavely deform the metal disc on the fluid pressure side of the stacked assembly and to sequentially deform each successive metal disc in the stacked assembly until the desired degree of curvature is obtained on the opposite side of the stacked assembly. This may be sensed by a limit switch or other control set at some predetermined point for contact by the convexly curved surface of the stacked assembly. During the forming operation the clamping members maintain the annular edge portion of each metal disc flat while the concave surface of each successive disc is formed by and complementary to the oppositely disposed surface of the preceding disc. This method of forming provides a slight increase in the radius of curvature of the dome-shaped interior portion of each successive disc while insuring that each successive pair of interfacing disc surfaces in the stacked assembly are matched or complementary to one another across the entire area of their respective interface.

When the forming operation is completed the stacked assembly is removed from the pressure vessel, and heat-treated, if the discs are formed of a heat-treatable metal. The flat annular edge portions are then fixed together to provide a circumferentially fixed composite diaphragm structure permitting independent sequential flexure of the curved interior portions of each successive element. The flat annular edge portions may be fixed together by a fusion weld as previously described or by other suitable means. Before the edge portions are fixed together, a thin film of lubricant may be disposed between the interfacing surfaces of the dome-shaped interior portions of the discs to facilitate relative movement therebetween.

The number of metal discs and the material from which they should be formed will depend upon the type of service for which a particular diaphragm structure or valve is intended. Satisfactory results have been obtained in a valve having a two inch seat port diameter in controlling the flow of water at 650° F. and a line pressure of 2,500 p.s.i. with a diaphragm structure comprising fifteen elements formed of 0.0045 inch thick discs of an age-hardenable, nickle-chrome-iron alloy marketed under the tradename Inconel Alloy No. 718. The active operational diameter of the diaphragm structure, that is, the diameter of the internal dome-shaped portion 44 as designated by the dotted line 45 in FIG. 3, was 3 inches.

The cup-shaped diaphragm plunger 52 is provided with an internal cylindrical bore 56 terminating in a bearing surface 58. The diameter of the bore 56 is adapted to slidingly receive the periphery of the operating stem collar 66 and the bearing surface 58 is preferably provided with a hardened inlaid metal to prevent wear and deformation after repeated contact with the oppositely disposed surface of the operating stem collar 66. The diaphragm plunger 52 is also provided with a diaphragm contacting surface 54 of generally convex curvature and peripherally bounded by its intersection with a cylindrical sidewall 55 at edge 59, see FIG. 4.

The generally convex diaphragm contacting surface 54 of plunger 52 is provided with several areas of different degrees of curvature. The diaphragm contacting surface is provided with a spherically curved area of generally cruciform shape 60. The spherically curved cruciform shape 60 is symmetrical with the axis of the plunger 52 and the legs 61 of the cruciform extend outwardly to the peripheral edge 59 of the diaphragm contacting surface 54, see FIGS. 4 and 7. Four equally spaced planar [62] *areas* or flats [61] *62* are provided around the peripheral edge 59 of the diaphragm contacting surface 54 between the legs 61 of the cruciform shape 60, see FIGS. 4, 5 and 6. The planar areas or flats 62 are disposed at an angle of inclination greater than the slope of the spherical curvature of surface area 60, for example, at an angle of about 78° to 82° to the axis of the plunger 52 when the spherical surface 60 is provided with a radius of about 4½ inches. The radius of the spherical curved surface 60 is preferably about the same or slightly greater than the radius of the oppositely disposed, spherically curved dome-shaped interior portion 44 of the diaphragm structure 42. The diameter of the peripheral wall 55 of plunger 52 is preferably less than the active operating diameter 45 of the diaphragm structure 42. Diaphragm plungers with peripheral wall diameters of approximately two-thirds the active operating diameter of their oppositely disposed diaphragm structures have proven quite satisfactory.

The diaphragm contacting surface 54 of plunger 52 is also provided with a flat center portion 64 of approximately the same or slightly less diameter than the disc stem 21 disposed on the opposite side of the diaphragm structure 42.

The spherically curved cruciform area 60 provides a cross-shaped primary diaphragm deflecting pattern when the plunger 52 is moved by the operating stem to seat the disc closure member 20 through the medium of the diaphragm structure 42 and disc stem 21. The planar areas or flats 62 provide relief areas for portions of the diaphragm between the legs 61 of the cross-shaped primary deflecting pattern 60. The planar areas 62 distort the diaphragm to a lesser extent than the spherically curved legs 61 of the cross-shaped pattern 60 thereby relieving to a degree the total stress induced in the diaphragm during distortion and avoiding the generation of concentric annular stress regions where stress induced cracking of the diaphragm surfaces will propagate in a circular path around the diaphragm.

When the disc closure member 20 is seated on the valve seat 18 to close the valve as shown in FIG. 2, the flat circular center area 64 of the diaphragm contacting surface 54 provides a sufficient area for transmitting the force necessary to hold the closure member 20 seated against fluid pressure in inlet passage 11 without inducing excessive localized compressive stresses in the diaphragm 42 between the diaphragm surface 54 and the disc stem 21.

The operation of the valve will now be described with reference to FIGS. 1 and 2. In FIG. 1 a valve having a seat port diameter of two inches is shown in the open position with the disc 20 spaced from the valve seat 18. In this position the spring 31 and fluid pressure in passage 11 respectively urge the disc stem 21 and disc 20 to the open position with further axial movement being restrained by engagement of disc stem 21 with the undersurface of the metal diaphragm structure 42. The opposite or dome-shaped side of the diaphragm structure 42 is in contact with surface 54 of diaphragm plunger 52 which may be either spaced from or seated against the bonnet 34 to prevent further upward movement of the diaphragm 42 and disc stem 21.

To close the valve, hand wheel 69 is rotated to impart axial movement to the valve operating stem 65 and collar 66. In the valve shown in the drawings this would be a downward movement to deform the metal diaphragm structure 42 and move the disc stem 21 and disc 20 approximately one quarter inch to close the valve as shown in FIG. 2. In the closed position the annular seating surface 22 of the disc closure member sealingly engages the valve seat 18 to prevent fluid flow through the valve. When it is desired to open the valve, the hand wheel 69 is rotated in the opposite direction to raise the operating stem 65 and collar 66 to the position shown in FIG. 1. The disc closure member 20 is moved to the open position under the biasing force of the spring 31 and the fluid pressure force at inlet passage 11.

As previously described the operating stem 65 is provided with a collar 90 having a radially extending arm 91 slidably received in an axially extending slot 78 provided to yoke member 70 which effectively provides a non-rotating operating stem 65. Although a rotating operating stem would be satisfactory for some applications, substantially improved results have been achieved through the use of the previously described non-rotating operating stem 65 which prevents the application of torsional stresses to the multiple ply diaphragm structure 42.

In either position, whether the valve be open or closed, the valve assembly is sealed against fluid leakage from the body cavity to atmosphere by the diaphragm structure and the circumferential weld fixing the diaphragm to the bonnet which together provide a metal barrier sealing the hollow interior portion of the valve bonnet and by the circumferential weld effected between the valve bonnet and valve body to seal against fluid leakage between those component parts of the valve assembly.

The invention may be embodied in other specific forms without departing from the spirit and essential characteristics thereof. The previously described embodiment is therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A valve assembly comprising a valve body defining an inlet passage and an outlet passage intersecting a body cavity, a valve seat, flow controlling means in said cavity including a valve closure element mounted for axial movement toward and away from said valve seat, a bonnet assembly fixed to said body to close said cavity and including plunger means disposed for axial movement toward and away from said valve seat, a dome-shaped metal diaphragm disposed between said flow controlling means and said bonnet assembly to seal at least a portion of said body cavity on one side of the diaphragm from fluid on the opposite side thereof, a diaphragm contacting surface on said plunger means comprising a flat center portion, a gradual convexly curved surface extending radially outward from said center portion and four surfaces of greater slope than said convexly curved surface equally spaced around the periphery of said diaphragm contacting surface and extending inward toward said center portion, and means for axially moving said plunger means to contact the domed surface of said diaphragm and deflect said diaphragm whereby said valve closure element is moved to sealingly engage said valve seat and close said inlet passage.

2. The valve assembly defined by claim 1 wherein said center portion of the diaphragm contacting surface is circular and said four surfaces of greater slope are spaced from said center portion and from each other by said convexly curved surface.

3. The valve assembly defined by claim 1 wherein said convexly curved surface is of spherical curvature and said four surfaces spaced around the pheriphery of said diaphragm contacting surface are planar surfaces spaced from one another and from said center portion by said surface of spherical curvature.

4. The valve assembly defined by claim 1 wherein said flow controlling means includes a closure stem fixed to a valve closure element and mounted for axial sliding movement in a control cartridge and means biasing said closure element to a position spaced from said valve seat.

5. [A] *An* actuating and control assembly for a valve having a dome-shaped metal diaphragm fixed in a body cavity to seal an area on the convexly curved side of said diaphragm from fluid on the opposite side thereof comprising:

a closure element, means mounting said closure element on the fluid side of said diaphragm for axial movement toward and away from a valve seat, plunger means having a convexly curved diaphragm contacting surface facing the convexly curved surface of said diaphragm and including at least two areas of different degrees of curvature, one of said areas being cruciform in shape and having a slope less than the slope of the areas between the legs of the cruciform to provide a cross-shaped primary diaphragm deflecting pattern and relief areas for portions of the diaphragm between the legs of said pattern, means mounting said plunger means for axially aligned movement with said closure element and concentric with said diaphragm, and means for axially moving said plunger means to contact and deflect said convexly curved surface of said diaphragm and move said closure element into sealing engagement with said valve seat.

6. The actuating and control assembly defined by claim 5 wherein said diaphragm contacting surface includes a flat center portion.

7. The actuating and control assembly defined by claim 5 wherein said area of cruciform shape is of spherical curvature and said areas between the legs of said cruciform shape are planar surfaces.

8. The actuating and control assembly defined by claim 7 wherein the radius of curvature of said spherically curved cruciform shape is at least as great as the radius of curvature of the oppositely disposed surface of said diaphragm.

9. A hermetically sealed valve comprising:

a body defining inlet and outlet passages intersecting a body cavity, a valve seat, a bonnet fixedly engaged with said body to close said cavity, said bonnet having a through bore opening into a hollow interior bounded by a *radially extending* depending annular surface, a valve stem mounted for axial movement in said through bore and plunger means in said hollow bonnet portion, a valve closure means disposed opposite said valve seat and mounted for axial movement toward and away from said seat, a metal diaphragm disposed across the hollow interior portion of said bonnet between said plunger means and said closure means and circumferentially welded to said *radially extending* depending annular surface to seal the interior of said bonnet from fluid present in the body cavity, a circumferentially continuous weld between said bonnet and said body to seal against fluid leakage around said bonnet, and means for moving said stem and plunger means to deflect said diaphragm and move said closure means to sealingly engage said valve seat.

10. The hermetically sealed valve defined by claim 9 wherein a peripheral groove adjacent said depending annular surface provides a radially extending lip to said bonnet, said metal diaphragm has a dome-shaped interior portion surrounded by a flat annular rim and said rim is welded to said bonnet between said radially extending lip and a metal ring to seal the interior portion of said bonnet.

11. The hermetically sealed valve defined by claim [10] *9* wherein said metal diaphragm is comprised of a plurality of thin *substantially* circular metal elements with their respective annular rims fused together and to [the oppositely disposed surfaces] *said depending annular surface* of said bonnet[and said metal ring].

12. A valve assembly comprising:

a valve body defining an inlet passage and an outlet passage intersecting a body cavity, a valve seat, flow controlling means in said cavity including a valve closure element mounted for axial movement toward and away from said valve seat, a valve bonnet fixed to said body to close said cavity and including plunger means mounted for axial movement toward and away from said valve seat, a dome-shaped metal diaphragm structure disposed transversly across said body cavity between said flow controlling means and said bonnet, said diaphragm structure comprising a plurality of thin circular metal elements each having a planar annular rim surrounding a dome-shaped interior portion superimposed one on top of another with their annular rims fixed together, an oppositely disposed convexly curved diaphragm contacting surface on said plunger means having at least two areas of different degrees of curvature, one of said areas being cruciform in shape and of a slope less than the slope of the areas between the legs of the cruciform to provide a cross-shaped primary diaphragm deflecting pattern and relief areas for portions of the diaphragm between the legs of said pattern, and means for moving said plunger means to deflect the dome-shaped portion of said diaphragm and move said closure element to sealingly engage said valve seat.

13. The valve assembly defined by claim 12 wherein said diaphragm contacting surface includes a flat circular center portion, said area which is cruciform in shape is of spherical curvature and said areas between the legs of the cruciform are planar surfaces disposed at an angle of inclination greater than the slope of curvature of said cruciform area.

14. The valve assembly defined by claim 13 wherein the radius of curvature of said spherically curved curciform shape is at least as great as the radius of curvature of the oppositely disposed surface of said diaphragm and said diaphragm contacting surface is bounded by a circular edge having a diameter less than the diameter of the dome-shaped interior portion of said diaphragm.

15. The valve assembly defined by claim 12 wherein said valve bonnet includes a depending annular surface and the annular rims of said metal elements are welded together and to said depending annular surface to seal the interior of said bonnet from fluid present in the body cavity.

16. The valve assembly defined by claim 15 wherein a circumferentially continuous weld is provided between said valve bonnet and said valve body to provide a metal barrier and seal against fluid leakage around said valve bonnet.

*17. The hermetically sealed valve defined by claim 9 wherein said metal diaphragm has a dome-shaped interior portion surrounded by a flat annular rim and said rim is welded to said bonnet at said radially extending depending annular surface.*

*18. The hermetically sealed valve defined by claim 17 wherein said metal diaphragm comprises a plurality of thin circular metal elements each having an annular rim surrounding a dome-shaped interior portion superimposed one on top of another with the convex surface of each metal element received within and complementary to the concave surface of each successive element and the annular rims fixed together to provide a rigid circumferential edge to the composite structure while permitting independent, sequen-*

*tial flexure of the dome-shaped interior portions of said structure under an applied load.*

*19. The hermetically sealed valve defined by claim 9 wherein said plunger means comprises a cup shaped diaphragm plunger having an internal cylindrical bore terminating in a bearing surface, the diameter of which is adapted to slidably receive a stem collar provided on said valve stem.*

*20. The hermetically sealed valve defined by claim 9, wherein said metal diaphragm has a dome-shaped interior portion surrounded by a flat annular rim and said rim is welded on one side to said bonnet around said radially extending annular surface and to an aligned metal ring on the opposite side.*

*21. The hermetically sealed valve defined by claim 20, wherein said metal diaphragm is comprised of a plurality of thin circular metal elements with their respective annular rims welded together and to oppositely disposed annular surfaces of said bonnet and said metal ring.*

*22. The hermetically sealed valve defined in claim 9, further including support structure mounted within said body cavity for slidably supporting said valve closure means, and a metal ring disposed between the rim of said diaphragm and support structure aligned with said diaphragm rim and welded to said diaphragm rim.*

*23. The hermetically sealed valve defined by claim 22, further including resilient means within said support structure biasing said closure means toward said diaphragm and away from said seat.*

* * * * *